3 Sheets
Sheet 1.

S. R. Nye.
Horse Rake.

N° 85757              Patented Jan. 12, 1869.

Witnesses
James Brown
C. B. Smead

Inventor
Sherman R. Nye

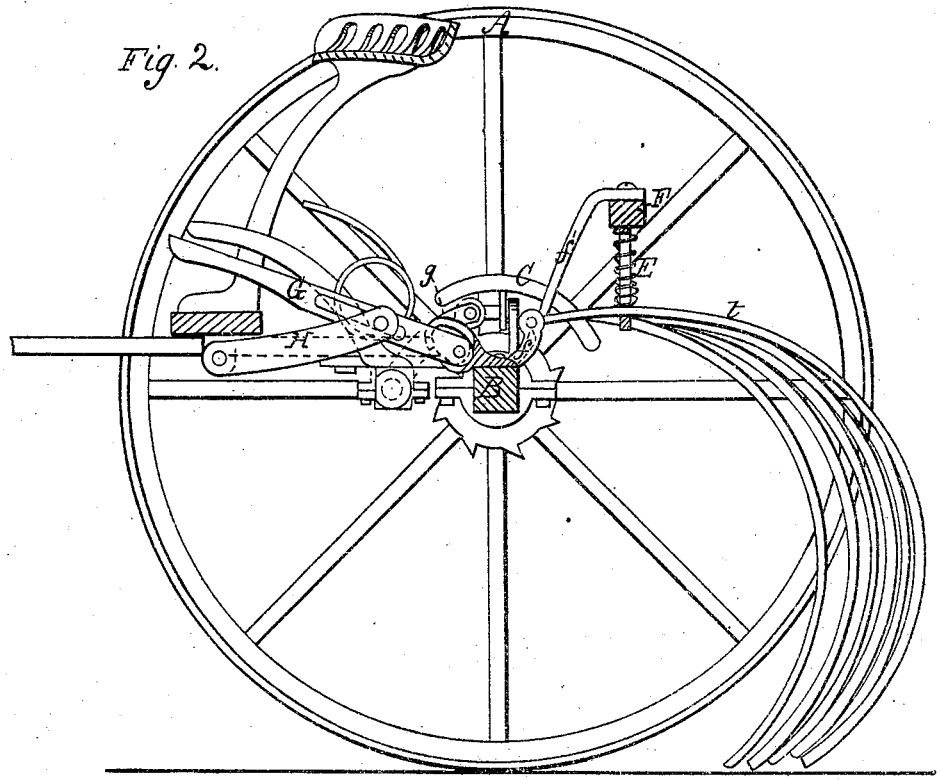

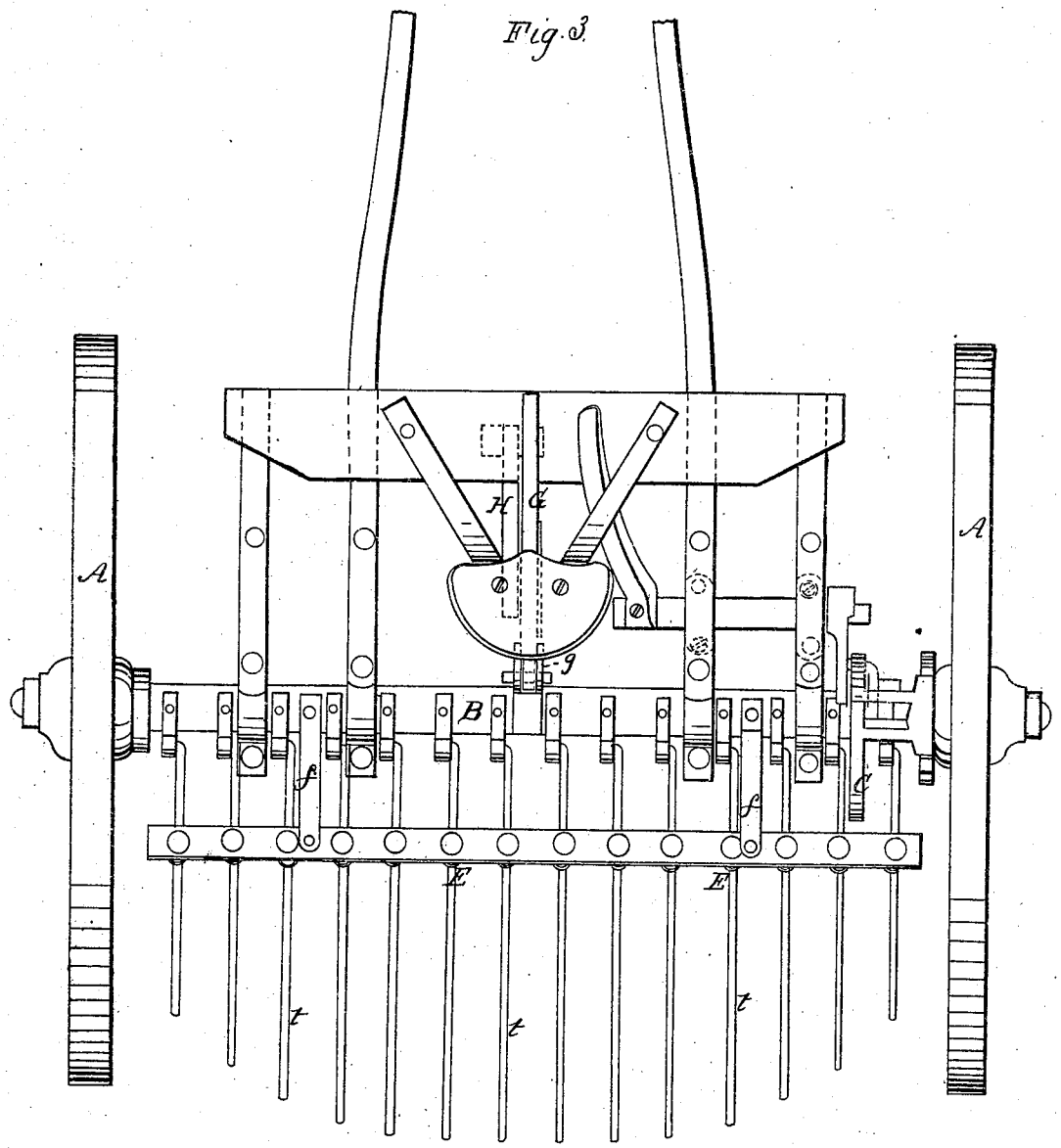

UNITED STATES PATENT OFFICE.

SHERMAN R. NYE, OF BARRE, ASSIGNOR TO HIMSELF AND ANDREW B. BARNARD, OF WORCESTER, MASSACHUSETTS.

IMPROVEMENT IN HORSE-RAKES.

Specification forming part of Letters Patent No. 85,757, dated January 12, 1869.

Be it known that I, SHERMAN R. NYE, of Barre, in the county of Worcester and State of Massachusetts, have invented certain new and useful Improvements in Horse Hay-Rakes, of which the following is a full, clear, and exact description, reference being had to the accompanying drawings, making a part of this specification, in which—

Figure 1:
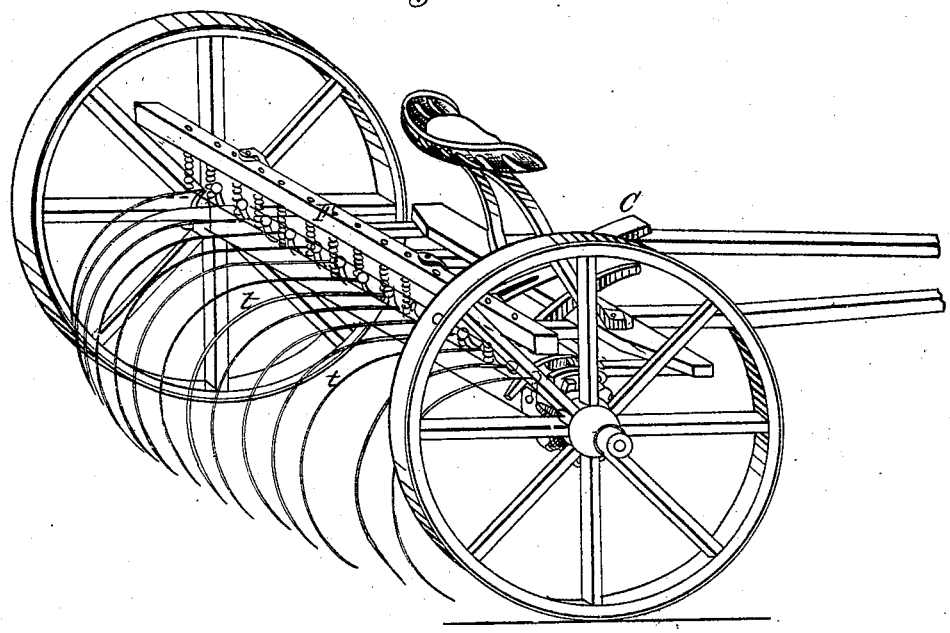
Figure 4:
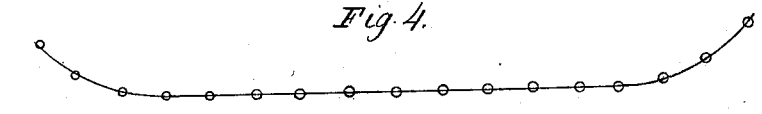
Figure 5:
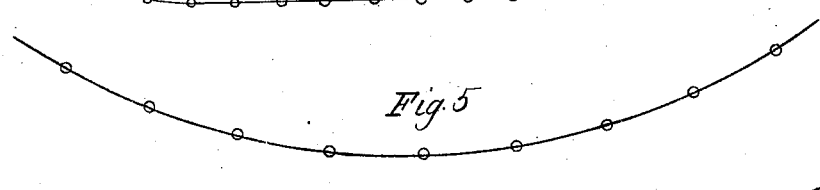
Figure 6:
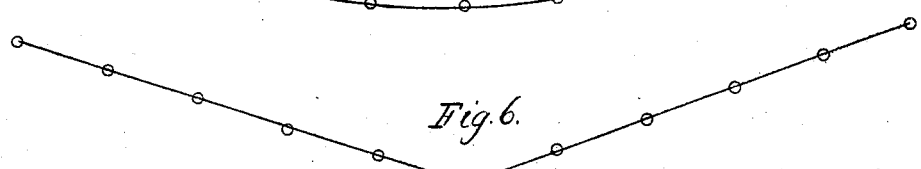
Figure 7:
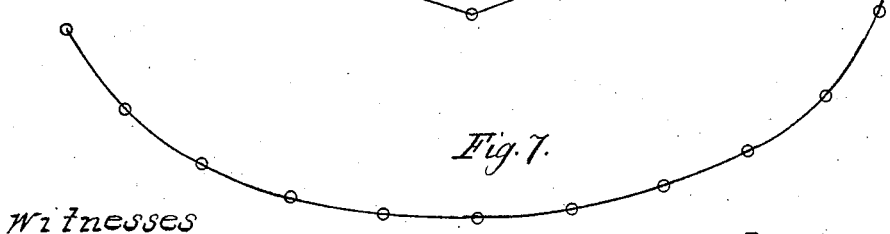

Figure 1 represents a perspective view of a machine embodying my improvements. Fig. 2 is a vertical longitudinal section. Fig. 3 is a plan view of the same. Figs. 4, 5, and 6 represent different modes of arranging the teeth of the rake.

Similar letters indicate like parts in the several figures.

The object of my invention is to so construct and arrange the teeth of horse or hand-wheel rakes as to enable them to gather the hay and prevent it from passing off from the sides of the machine, and also to provide a ready means for securely holding the teeth upon the ground while the machine is in operation; and the invention consists in constructing and arranging the teeth in such a manner that the points of those at and near each side of the machine will be in a position gradually in advance of those at the central portion, or, in other words, with the points describing a curve toward the sides of the machine, those at the extreme ends being farthest in advance of any and all the others.

The invention further consists in a peculiar arrangement for holding the axle-tree to which the teeth are attached from turning, so as to cause the latter to bear upon the ground during the operation of raking.

In general construction and operation the rake to which my present improvements are applied is similar to that for which a patent was granted to me on March 13, 1866. As in the said patent, the rake is elevated by power derived directly from the wheel by means of dog mounted on the axle, near the hub of one of the wheels, in connection with a toothed wheel or plate secured to the hub of one of the wheels. The dog is thrown into gear with the toothed wheel or plate by means of an arm carrying a friction-wheel, the said arm being connected to a foot-lever near the driver's seat.

Referring to the drawings, A A' represent the wheels attached to the axle or shaft B. Upon the shaft B is secured a series of short arms, b, to which are hinged or pivoted the teeth t.

C' is a dog or clutch arranged upon the axle B near the hub of one of the wheels, and provided with stops or teeth, which may be thrown into gear with a toothed wheel or plate secured to the hub of the wheel, so that as the wheel rotates, when the clutch or dog is thrown into gear with the same, the teeth of the rake will be elevated. The clutch is operated by means of a rock-shaft, to which is attached a lever under control of the driver's foot. The teeth are prevented from any lateral movement by means of staples, through which they pass, the said staples being attached to a transverse bar secured to braces f, which are attached to the main axle, and the teeth are held down by means of coiled springs bearing upon each of the teeth, so that any one of the same is allowed to rise to pass over any obstructions.

In the machine above referred to, which was patented to me, and in all other hay-rakes with which I am acquainted, the teeth in each machine are made of uniform length and of the same curvature respectively. In this way the hay, as it is gathered up by the teeth, is liable to spread out and escape at the sides of the machine.

In my present invention I make the teeth of different lengths in the same machine, and vary their curvature in such a manner as to bring the points or lower ends of those at or near the sides of the machine gradually farther forward of those at or near the center, as shown in Fig. 1. This may be done by leaving a portion of the teeth in the center of the rake on a line and of the same length and curvature with each other, and then gradually contracting those at each side on a regular curve, as shown in Fig. 4, or one or more at the ends may be contracted; or the whole series of teeth may be so arranged that their points will describe a regular curve; and, again, they may be arranged at an angle in the center and converging in straight lines on each side toward the sides of the machine, as shown in Fig. 5.

By means of the above-described construction of the rake or arrangement of the teeth the separation of the hay to be gathered into a windrow from that remaining is rendered much more perfect than by the usual construction, and the edges of that remaining are left more regular. The machine is also rendered capable of doing the work much quicker and with less waste than those of the ordinary construction.

The invention is equally applicable to hand hay-rakes.

To the central portion or nearly so of the axle B or the rake-head, if an extra head is used, is attached a support, $g$, formed with an opening or openings, in which plays a pin attached to the rear end of a lever, G, so as to allow of a changeable motion of the pivoted end of the said lever. The central portion of the lever G is slotted, and in the slot is fitted a bolt, which is attached to an arm, H, pivoted to a cross-piece on the frame.

The parts G and H form a compound lever, the part G being so arranged as to be easily operated by the foot of the driver, by which means a very great pressure can be easily exerted upon the axle B or head to press the teeth upon the ground, and the pin which holds the rear end of the lever G, playing loosely in the support $g$, allows the shaft or axle B to be readily operated.

The lever G may, however, be pivoted directly to the support, if desirable.

Having thus described my invention, what I claim as new, and desire to secure by Letters Patent, is—

1. So constructing and arranging the teeth of a hay-rake that the points of those at or near the sides of the machine will be brought gradually forward of those at or near the center, substantially as set forth.

2. The combination of the levers G and H and the support $g$, attached to the axle or rake-head B, arranged and operating as and for the purpose described.

In testimony whereof I have signed my name to this specification in the presence of two subscribing witnesses.

SHERMAN R. NYE.

Witnesses:
J. H. ADAMS,
JAMES BROWN.